US009727075B2

(12) United States Patent
Nagasawa

(10) Patent No.: US 9,727,075 B2
(45) Date of Patent: Aug. 8, 2017

(54) POWER-SUPPLY VOLTAGE SENSING CIRCUIT

(71) Applicant: KABUSHIKI KAISHA TOSHIBA, Tokyo (JP)

(72) Inventor: Hironori Nagasawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/051,304

(22) Filed: Feb. 23, 2016

(65) Prior Publication Data

US 2017/0108890 A1 Apr. 20, 2017

(30) Foreign Application Priority Data

Oct. 15, 2015 (JP) ................................ 2015-203805

(51) Int. Cl.
*H02M 3/158* (2006.01)
*H02M 3/156* (2006.01)
*G05F 5/00* (2006.01)

(52) U.S. Cl.
CPC .................................... *G05F 5/00* (2013.01)

(58) Field of Classification Search
CPC . H02M 2001/0003; H02M 2001/0022; H02M 3/156; H02M 3/158; G05F 5/00
See application file for complete search history.

(56) References Cited

U.S. PATENT DOCUMENTS 4,978,829 A * 12/1990 Gurwicz ................ B23H 1/022 219/69.13
5,161,097 A * 11/1992 Ikeda ...................... G05F 1/563 323/222
8,085,007 B2 * 12/2011 Sakimura ............. H02M 3/156 323/222
8,618,781 B2 12/2013 Miyamae
8,970,790 B2 3/2015 Murakami
2014/0084893 A1 * 3/2014 Chen ......................... G05F 5/00 323/299
2015/0015226 A1 * 1/2015 Ishii ...................... H02M 3/156 323/282
2016/0062383 A1 3/2016 Nagasawa

FOREIGN PATENT DOCUMENTS

JP 2005-135112 A 5/2005
JP 2010057231 A 3/2010

* cited by examiner

*Primary Examiner* — Gary L Laxton
(74) *Attorney, Agent, or Firm* — Patterson & Sheridan, LLP

(57) ABSTRACT

A power-supply voltage sensing circuit includes a switch circuit having an input connected to a power supply and an output connected to a main circuit, a first circuit that outputs a first signal controlling ON/OFF of the switch circuit in accordance with a power-supply voltage supplied by the power supply, a second circuit that delays the first signal and outputs the delayed first signal as a second signal, a first transistor that outputs a first voltage in accordance with the second signal from the second circuit, a third circuit that outputs a reference voltage when supplied with the power-supply voltage, and a comparison circuit that outputs a third signal that controls whether or not the main circuit is operated in accordance with the first voltage and the reference voltage.

20 Claims, 5 Drawing Sheets

POWER-SUPPLY VOLTAGE SENSING CIRCUIT

CROSS-REFERENCE TO RELATED APPLICATION

This application is based upon and claims the benefit of priority from Japanese Patent Application No. 2015-203805, filed Oct. 15, 2015, the entire contents of which are incorporated herein by reference.

FIELD

Embodiments described herein relate generally to power-supply voltage sensing circuits.

BACKGROUND

A power-supply voltage sensing circuit that senses a power-supply voltage which is supplied from the outside and starts an operation of a predetermined circuit is known.

DETAILED DESCRIPTION

Figure 1:
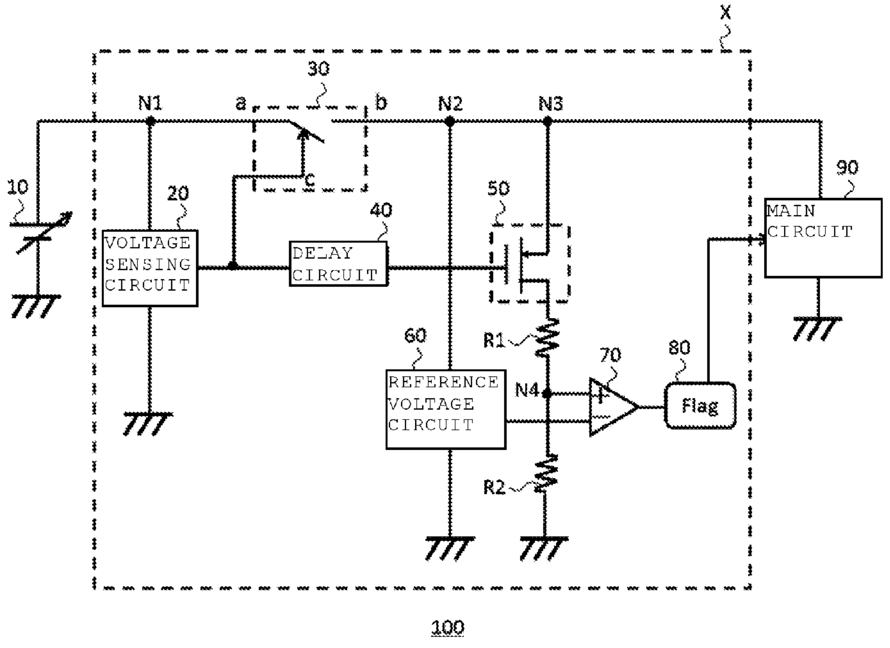
FIG. 1 is a circuit diagram depicting an example of a power-supply voltage sensing circuit according to a first embodiment.

An example embodiment improves the reliability of the operation of a power-supply voltage sensing circuit.

In general, according to one embodiment, a power-supply voltage sensing circuit includes a switch circuit having an input connected to a power supply and an output connected to a main circuit, a first circuit that outputs a first signal controlling ON/OFF of the switch circuit in accordance with a power-supply voltage supplied by the power supply, a second circuit that delays the first signal and outputs the delayed first signal as a second signal, a first transistor that outputs a first voltage in accordance with the second signal from the second circuit, a third circuit that outputs a reference voltage when supplied with the power-supply voltage, and a comparison circuit that outputs a third signal that controls whether or not the main circuit operates in accordance with the first voltage and the reference voltage.

Hereinafter, embodiments are described with reference to the drawings.

In this disclosure, some components are expressed in plural form as an example. However, this example is presented by way of example only, and these component elements can also be expressed in other forms. Moreover, a component element which is not expressed in plural form may be expressed in other forms.

Furthermore, the drawings are schematic drawings and the relationship between a thickness and a planar size, a wiring length ratio, and so forth may be different from the actual relationship and ratio. Moreover, some portions may have different size relationships or ratios in different drawings. In addition, the number and placement of component elements such as a transistor, an inverter, a resistor, and a capacitor which are depicted in circuit diagrams is an example and is not limited to the number and placement depicted in the drawings.

First Embodiment

FIG. 1 is a circuit diagram depicting an example of a power-supply voltage sensing circuit X according to a first embodiment. As depicted in FIG. 1, the power-supply voltage sensing circuit X according to this embodiment is connected to a power supply (an external power supply) 10 and a main circuit (a load circuit) 90. Moreover, the power-supply voltage sensing circuit X includes a voltage sensing circuit (a first circuit) 20, a switch circuit 30, a delay circuit (a second circuit) 40, a first transistor 50, a reference voltage circuit (a third circuit) 60, a comparison circuit (a fourth circuit) 70, a flag terminal (Flag) 80, a first resistor R1, and a second resistor R2.

Incidentally, in this disclosure, the first resistor R1 and the second resistor R2, for example, are sometimes expressed simply as R1 and R2, respectively. The same goes for other components which are described later.

Moreover, the power-supply voltage sensing circuit X, the power supply (the external power supply) 10, and the main circuit (the load circuit) 90 may be collectively called an integrated circuit (IC) 100. Additionally, in this embodiment, the IC 100 does not necessarily have to include the power supply 10 and the main circuit 90 which are depicted in FIG. 1. For example, the power supply 10 provided outside the IC 100 and the IC 100 may be connected to each other or the main circuit 90 and the power supply 10 may be provided independently with the IC 100. In other words, the power-supply voltage sensing circuit X according to this embodiment can also be called the IC 100.

Furthermore, "be provided independently" here means that the main circuit 90 and the power supply 10 are not provided on a single substrate in the IC 100, where the substrate here is a Si wafer, for example, but is not limited thereto. For example, the main circuit 90 and the power supply 10 are provided independently with the IC 100" refers to a state in which the voltage sensing circuit 20, the switch 30, the delay circuit 40, the first transistor 50, the reference voltage circuit 60, the comparison circuit 70, the flag terminal 80, and the resistors R1 and R2 are mounted on a single substrate and the power supply 10 (or a component element having a similar function) and the main circuit 90 (or a component element having a similar function) are not mounted on the substrate.

The power supply 10 supplies a voltage to the main circuit 90. In this embodiment, the power supply 10 is a direct-current power supply and the power-supply voltage supplied by the power supply 10 is assumed to be Vdd.

The power-supply voltage sensing circuit X determines whether or not the power supply 10 supplies a voltage to the main circuit 90. More specifically, the power-supply voltage sensing circuit X determines whether or not the voltage (the power-supply voltage Vdd) supplied to a first node N1 by the power supply 10 is supplied to the main circuit 90. Incidentally, if the voltage at the first node is assumed to be Vn1, Vn1=Vdd as mentioned above.

The main circuit 90 operates as a result of the power-supply voltage Vdd from the power-supply voltage sensing circuit X being supplied thereto. The main circuit 90 includes, for example, a read-only memory (ROM) circuit and a control circuit that controls a read operation of the ROM circuit. The main circuit 90 may be a memory circuit, a logic circuit, or the like other than the ROM circuit described above.

Figure 2:
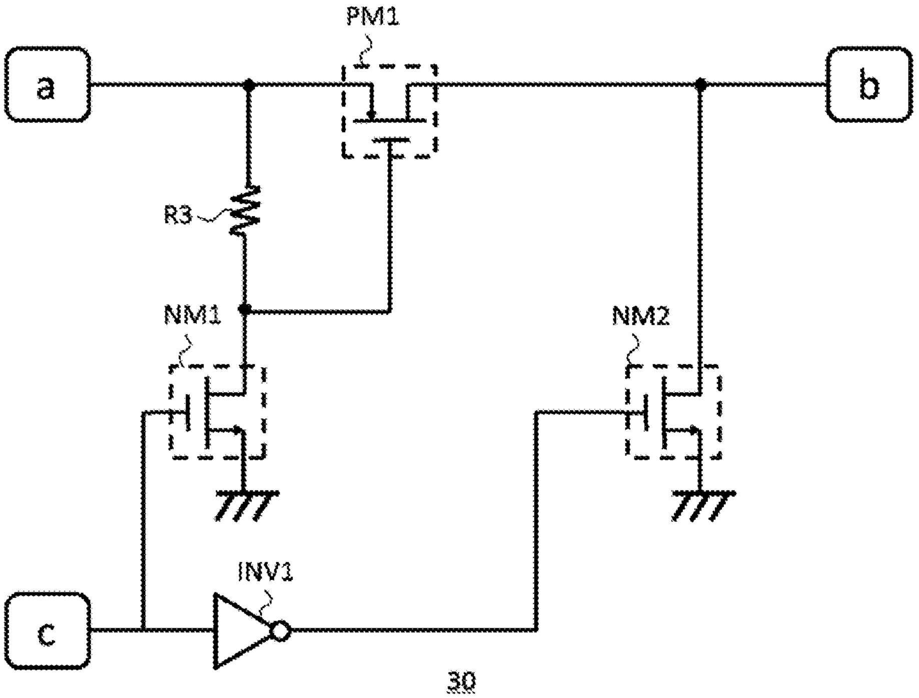
FIG. 2 is a circuit diagram depicting an example of a switch circuit in the power-supply voltage sensing circuit of FIG. 1.

FIG. 2 is a circuit diagram depicting an example of the switch circuit 30. The switch circuit 30 has, for example, a first PMOS transistor PM1, a first NMOS transistor NM1, a second NMOS transistor NM2, a third resistor R3, and a first inverter INV1.

The switch circuit 30 includes an input portion (a terminal a) connected to the first node N1 and an output portion (a terminal b) connected to a second node N2. That is, the switch circuit 30 includes the input portion connected to the power supply 10 and the output portion connected to the main circuit 90.

When a terminal c is at high level (High), since NM1 is turned on (On), the gate potential of PM1 becomes 0 V. Since PM1 is also turned on, the terminal a and the terminal b become electrically connected. On the other hand, since INV1 is connected between the terminal c and NM2, NM2 is turned off (Off) and does not affect the terminal b.

Moreover, when the terminal c is at low level (Low), NM1 is turned off. Thus, a gate terminal of PM1 becomes at the same potential as the terminal a and the terminal a and the terminal b become electrically disconnected (enter an insulating state). On the other hand, since NM2 is turned on, the terminal b becomes 0 V.

By the above operation, the switch circuit 30 controls whether or not the power-supply voltage Vdd supplied from the power supply 10 is supplied to the second node N2. Technically, although a voltage Vn2 which is supplied to the second node N2 when the switch 30 is turned on is sometimes not equal to the power-supply voltage Vdd due to power loss or the like, the influence thereof is assumed to be sufficiently small and thus can be ignored.

The voltage sensing circuit 20 senses the voltage Vn1 (=the power-supply voltage Vdd) at the first node N1. Furthermore, the voltage sensing circuit 20 controls the switch 30 by outputting a control signal (a first signal) based on the sensed power-supply voltage Vdd.

For example, if the power-supply voltage Vdd is smaller than or equal to a first threshold value Vdet1 (Vdd Vdet1), the voltage sensing circuit 20 outputs the first signal having a state which turns the switch circuit 30 off. Incidentally, "turning the switch circuit 30 off" here includes keeping the OFF state if the switch circuit 30 is already OFF (for example, an initial state).

Thus, in this case, the state of the first signal is Low. That is, if the output of the voltage sensing circuit 20 is Low, the terminal a and the terminal b enter an insulating state.

On the other hand, if the power-supply voltage Vdd is greater than the first threshold value Vdet1 (Vdd>Vdet1), the voltage sensing circuit 20 outputs the first signal with a state which turns the switch circuit 30 on. Incidentally, "turning the switch circuit 30 on" here includes keeping the ON state if the switch circuit 30 is already ON.

Thus, in this embodiment, the state of the first signal is High, for example. That is, if the output of the voltage sensing circuit 20 is High, the terminal a and the terminal b become electrically connected.

By the above operation, the voltage sensing circuit 20 controls the switching operation (ON/OFF) of the switch circuit 30 by outputting the first signal to the switch circuit 30. In other words, a determination as to whether or not the power-supply voltage Vdd supplied from the power supply 10 is supplied to the second node N2 is made depending on whether the power-supply voltage Vdd is greater or smaller than the first threshold value Vdet1.

Figure 3:
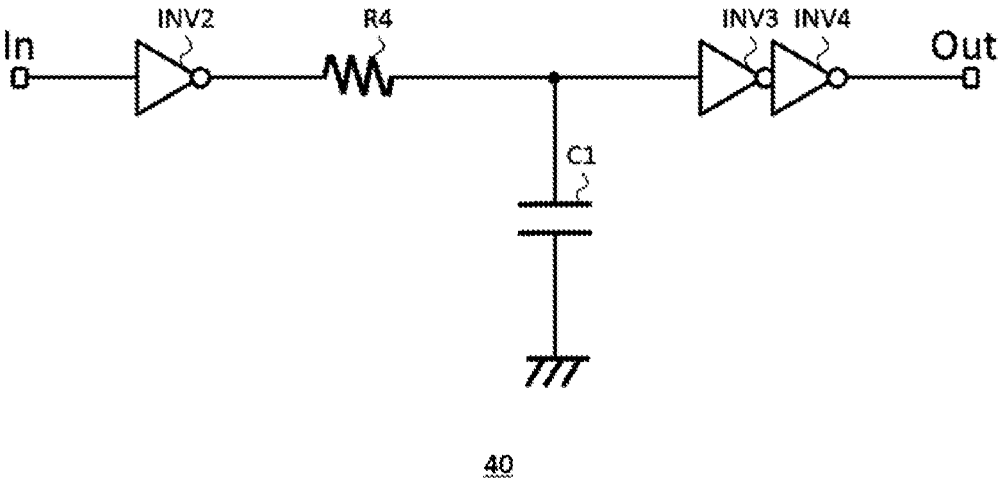
FIG. 3 is a circuit diagram depicting an example of a delay circuit in the power-supply voltage sensing circuit of FIG. 1.

Furthermore, if the output of the voltage sensing circuit 20 is High, the output is input to the delay circuit 40. FIG. 3 is a circuit diagram depicting an example of the delay circuit 40. The delay circuit 40 includes, for example, a second inverter INV2, a third inverter INV3, a fourth inverter INV4, a fourth resistor R4, and a first capacitor C1.

If the input to the delay circuit 40 is High, the output (the second signal) of the delay circuit 40 is changed to Low after a lapse of a time td (a delay time, a first time) from that point in time at which the output of the voltage sensing circuit 20 becomes High and is output.

Incidentally, the delay time td is a constant that is determined by the resistance value of R4 and the capacitance value of C1 and a desired delay time td can be obtained by selecting R4 and C1. In other words, the delay circuit 40 intentionally delays the first signal and then outputs the second signal.

The first transistor 50 is connected to the delay circuit 40. More specifically, agate terminal of the first transistor 50 is connected to the delay circuit 40, and, if the output of the delay circuit 40 is Low, the first transistor 50 is switched from OFF to ON by the output (the second signal). Incidentally, the first transistor 50 is a P-type MOS transistor, for example.

If the first transistor 50 is OFF, 0V is output therefrom, and, if the voltage at the fourth node N4 is assumed to be Vn4, Vn4=0 V.

On the other hand, if the first transistor 50 is turned on by receiving a Low output from the delay circuit 40, the output (the first voltage) of the first transistor 50 is a value obtained by dividing a voltage (Vn3) at a third node N3 by the sum of the on resistance (temporarily assumed to be Rtr) of the first transistor 50 and R1 and R2. Therefore, since this output coincides with Vn4, Vn4=Vn3×R2/(Rtr+R1+R2), where Vn3≈Vdd.

Incidentally, the first transistor 50 is used as a switching element and a smaller on resistance Rtr of the first transistor 50 is desirable. Thus, ideally, Rtr<<R1, and the size of the first transistor 50 has to be selected such that Rtr<<R1 holds. The resistance value of R2 is determined based on the value of R1+Rtr.

The reference voltage circuit 60 begins operating when it is supplied with the voltage Vn2 (≈Vdd) at the second node N2 and outputs a reference voltage. Here, the reference voltage output by the reference voltage circuit 60 is assumed to be Vm.

Incidentally, the on resistance of the switch circuit 30 is determined such that the power-supply voltage Vdd and the voltage Vn2 at the second node N2 become nearly equal when the switch circuit 30 is ON (that is, when Vdd>Vdet1).

The comparison circuit 70 receives, as inputs, the voltage Vn4 at the fourth node N4 (that is, the output of the first transistor 50: the value obtained by dividing the voltage (Vn3) at the third node N3 by the sum of the on resistance Rtr of the first transistor 50 and R1 and R2) and the output Vm of the reference voltage circuit 60 and compares the voltage Vn4 and the output Vm. Incidentally, the two inputs to the comparison circuit 70 are expressed as Vin+ and Vin−, and Vin+=Vn4 (the first voltage) and Vin−=Vm (the reference voltage).

Moreover, the comparison circuit 70 compares Vin+and Vin− to determine which is greater or smaller than the other, and outputs a control signal (a third signal) controlling the operation of the main circuit 90 in accordance with the comparison result. Incidentally, "controlling the operation" here refers to controlling whether or not to operate the main circuit 90, for example.

The comparison circuit 70 generates a binary output: High or Low. More specifically, the comparison circuit 70 outputs Low if Vin+≤Vin− and outputs High if Vin+>Vin−. Incidentally, the main circuit 90 starts operation by receiving a High signal from the comparison circuit 70 and stops operation by receiving a Low signal from the comparison circuit 70.

Therefore, if the output (Vn4, the first voltage) of the first transistor 50 is smaller than or equal to the reference voltage (Vm) (that is, Vin+≤Vin−), the comparison circuit 70 outputs the third signal having a low state stopping the operation of the main circuit 90 and stops the main circuit 90. Incidentally, "stopping the operation" here also includes keeping the stopped state if the main circuit 90 is already stopped (for example, an initial state).

On the other hand, if the output (Vn4, the first voltage) of the first transistor 50 is greater than the reference voltage (Vm) (that is, Vin+>Vin−), the comparison circuit 70 outputs the third signal having a high state starting the operation of the main circuit 90 and operates the main circuit 90. Incidentally, "starting the operation" here also includes keeping the operation state if the main circuit 90 is already operating.

The flag terminal 80 inverts the state thereof depending on the input. For example, when the input is inverted from Low to High, the flag terminal 80 inverts the state thereof and sets a flag. Moreover, in this embodiment, the flag terminal 80 can determine whether to operate the main circuit 90 or not or stop the main circuit 90 or not.

Specifically, the comparison circuit 70 receives Vin+ and Vin− as inputs, and, if a state in which one of Vin+ and Vin− is greater than the other is changed to a state in which the other is greater than the one of Vin+ and Vin−, the flag terminal 80 inverts. In this embodiment, as a result of the input to the flag terminal 80 (the output of the comparison circuit 70: the third signal) being switched to a High state, the main circuit 90 starts operation.

As described above, in this embodiment, from the point in time at which the output of the voltage sensing circuit 20 becomes High, the state in which Vn4=0 V and Vm>Vn4 (=0 V) is kept until the delay time td elapses. That is, during this period, the flag terminal 80 is kept in the initial state and make the main circuit 90 keep stopping. Then, when Vn4 increases after a lapse of the delay time td and Vm becomes greater than Vn4, the flag terminal 80 inverts and the main circuit 90 starts to operate.

Figure 4:
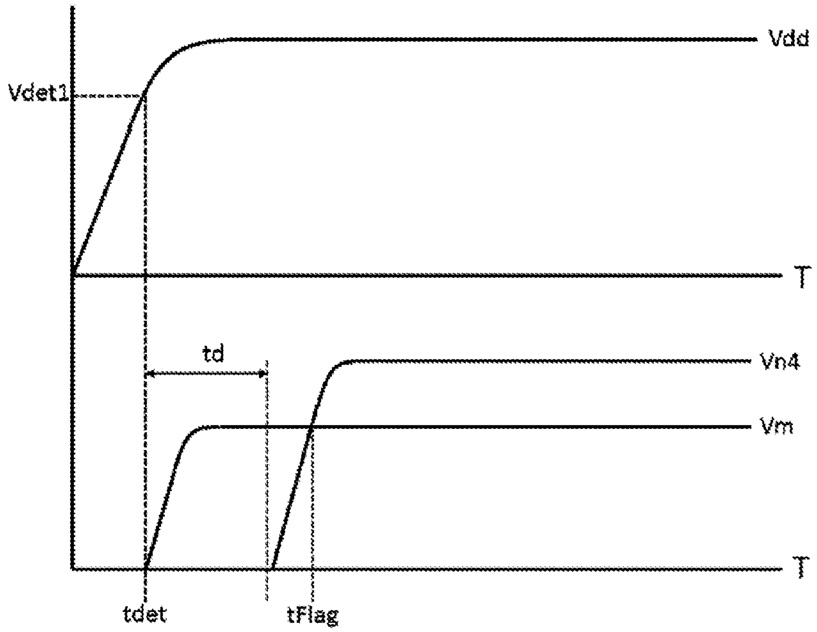
FIG. 4 is a graph schematically depicting temporal changes in Vm and Vn4 in the power-supply voltage sensing circuit of FIG. 1.

FIG. 4 is a graph schematically depicting temporal changes in Vm and Vn4 in the example described in this embodiment. In FIG. 4, the time elapsed after the start of the power supply 10 is assumed to be T. Hereinafter, with reference to FIGS. 1 to 4, an example of the operation of the IC 100 according to this embodiment is described.

As described earlier, the power-supply voltage Vdd supplied from the power supply 10 increases from 0 V and when the power-supply voltage Vdd exceeds the first threshold value Vdet1, the output of the voltage sensing circuit 20 is switched to a High state and the voltage sensing circuit 20 switches the switch circuit 30 from OFF to ON. Incidentally, the time after the power supply 10 is started and the power-supply voltage Vdd reaches the first threshold value Vdet1 is assumed to be tdet. Thus, the switch circuit 30 is switched to ON at T=tdet.

As a result, the terminal a and the terminal b of the switch circuit 30 become electrically connected and the power-supply voltage Vdd is transferred to the power-supply line (the second node N2) of the reference voltage circuit 60. Therefore, the reference voltage circuit 60 outputs the reference voltage Vm from T=tdet.

On the other hand, the output (High) of the voltage sensing circuit 20 is input to the delay circuit 40 at T=tdet. The delay circuit 40 performs output in response to this input after a lapse of the delay time td. Therefore, the delay circuit 40 outputs Low in response to the input of High after T=tdet+td.

The output (Low) from the delay circuit 40 is input to the gate terminal of the first transistor 50 at T=tdet+td and the first transistor 50 is switched from OFF to ON. When the first transistor 50 is turned on, the first transistor 50 outputs a value obtained by dividing the voltage Vn3 Vdd) at the third node N3, and the voltage Vn4 at the fourth node N4 increases. Thus, the voltage Vn4 at the fourth node N4 starts to increase at T=tdet+td.

The reference voltage Vm and the voltage Vn4 at the fourth node N4 are input to the comparison circuit 70. Incidentally, as described earlier, Vin+=Vn4 and Vin−=Vm. Moreover, as is clear from FIG. 4, Vin+ satisfies Vin+ =Vn4=0 V when T <tdet+td; on the other hand, Vin− satisfies Vin−=Vm=0 V when T<tdet.

Thus, in this embodiment, Vin+≤Vin− at least when T <tdet+td. During this period, the output of the comparison circuit 70 is Low and the flag terminal 80 keeps the initial state. Then, when, at T=tdet+td, the voltage Vn4 at the fourth node N4 starts to increase and a state in which one of Vin+ and Vin− is greater than the other is changed to a state in which the other is greater than the one of Vin+ and Vin− (that is, at T=tFlag, Vin+>Vin−), the output of the comparison circuit 70 is switched from Low to High, and the flag terminal 80 sets a flag and starts the operation of the main circuit 90.

By the above operation, in this embodiment, the power-supply voltage sensing circuit X determines whether or not the power supply 10 supplies the voltage to the main circuit 90, that is, whether or not the main circuit 90 is operated.

In this embodiment, the power-supply voltage sensing circuit X (that is, the IC 100) includes the delay circuit 40; here, a case in which the power-supply voltage sensing circuit X does not include the delay circuit 40 is considered. If the delay circuit 40 is not provided, the two inputs: Vin+ and Vin− to the comparison circuit 70 can be input to the comparison circuit 70 at almost the same time. Incidentally, the reference voltage Vm which is output from the reference voltage circuit 60 generally does not become a desired value for some time after the power-supply voltage Vdd becomes greater than Vdet1. Therefore, if the comparison operation by the comparison circuit 70 is performed before Vm becomes a desired value, an erroneous comparison result may be output.

Moreover, a configuration in which the reference voltage circuit 60 receives the supply of the voltage directly from the power supply 10 (that is, receives the supply of the voltage from the first node N1) may be possible. However, in this case, since the reference voltage circuit 60 is always operating after the startup of the power supply 10, the power consumption may be increased.

Thus, in this embodiment, the power-supply voltage sensing circuit X (that is, the IC 100) includes the delay circuit 40 and one of the inputs of the comparison circuit 70: Vin+=Vn4 is input (an increase of the voltage value is started) after the other input: Vin−=Vm after a delay of the delay time td. Therefore, a comparison by the comparison circuit 70 can be performed after a lapse of a sufficient time that allows the reference voltage Vm which is the output from the reference voltage circuit 60 to become a desired value, whereby a more accurate comparison can be performed.

Moreover, since the comparison operation by the comparison circuit 70 is not performed immediately after the startup of the power supply 10, the reference voltage Vm output from the reference voltage circuit 60 may be delayed. Therefore, the power supply of the reference voltage circuit 60 can be obtained from the second node N2, whereby low power consumption can also be achieved.

In this embodiment, the power-supply voltage sensing circuit X (that is, the IC 100) performs voltage sensing multiple times, that is, in two stages. Thus, as compared to a case in which, for example, the power-supply voltage sensing circuit X includes only the voltage sensing circuit 20 (a case in which the power-supply voltage sensing circuit X performs voltage sensing in one stage), the accuracy of voltage sensing is increased.

Figure 5:
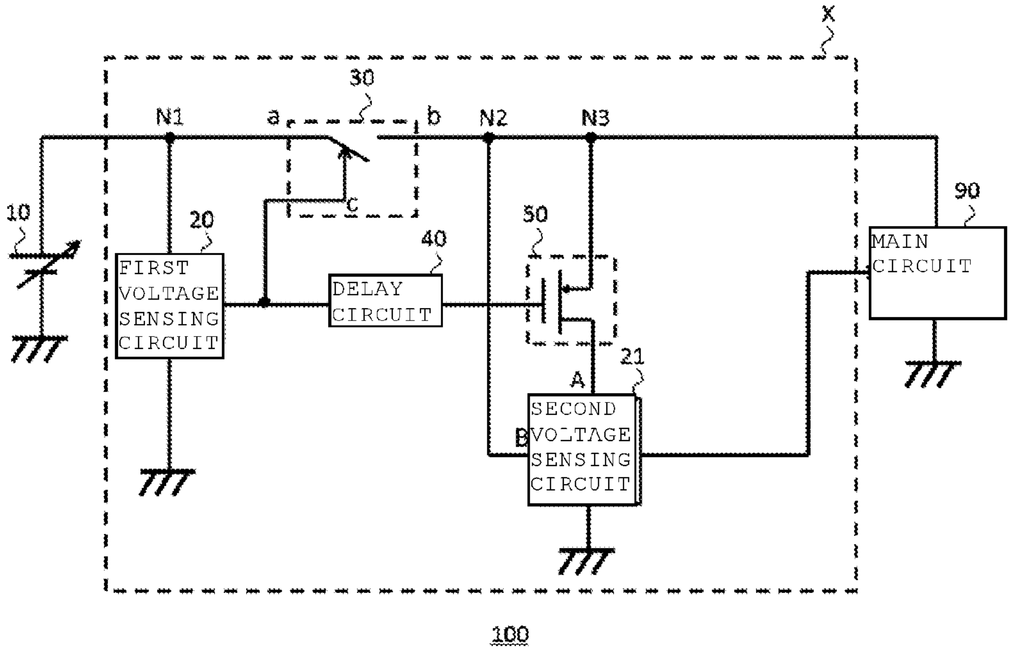
FIG. 5 is a circuit diagram depicting another example of the power-supply voltage sensing circuit according to the first embodiment.

Moreover, in this embodiment, as described above, voltage sensing is performed in two stages. As a result, as depicted in FIG. 5, for example, the power-supply voltage sensing circuit X performs voltage sensing by the voltage sensing circuit (a first voltage sensing circuit) 20 and a second voltage sensing circuit 21. A second voltage sensing circuit 21 includes the reference voltage circuit (the third circuit) 60, the comparison circuit 70, the flag terminal (Flag) 80, the first resistor R1, and the second resistor R2.

Furthermore, to the second voltage sensing circuit 21, a first input voltage which is input to a terminal B from the second node N2 (that is, the switch 30) and a second input voltage which is input to a terminal A from the first transistor 50 are input, and the second voltage sensing circuit 21 determines whether or not to operate the main circuit 90 based on the first input voltage and the second input voltage. Incidentally, the second input voltage is input after the first input voltage by being delayed by the delay circuit 40 by the time td (the delay time, the first time).

The above-described second voltage sensing circuit 21 may include the delay circuit 40 and the first transistor 50, or the flag terminal 80, for example, may be omitted from the second voltage sensing circuit 21.

(Second Embodiment)

Figure 6:
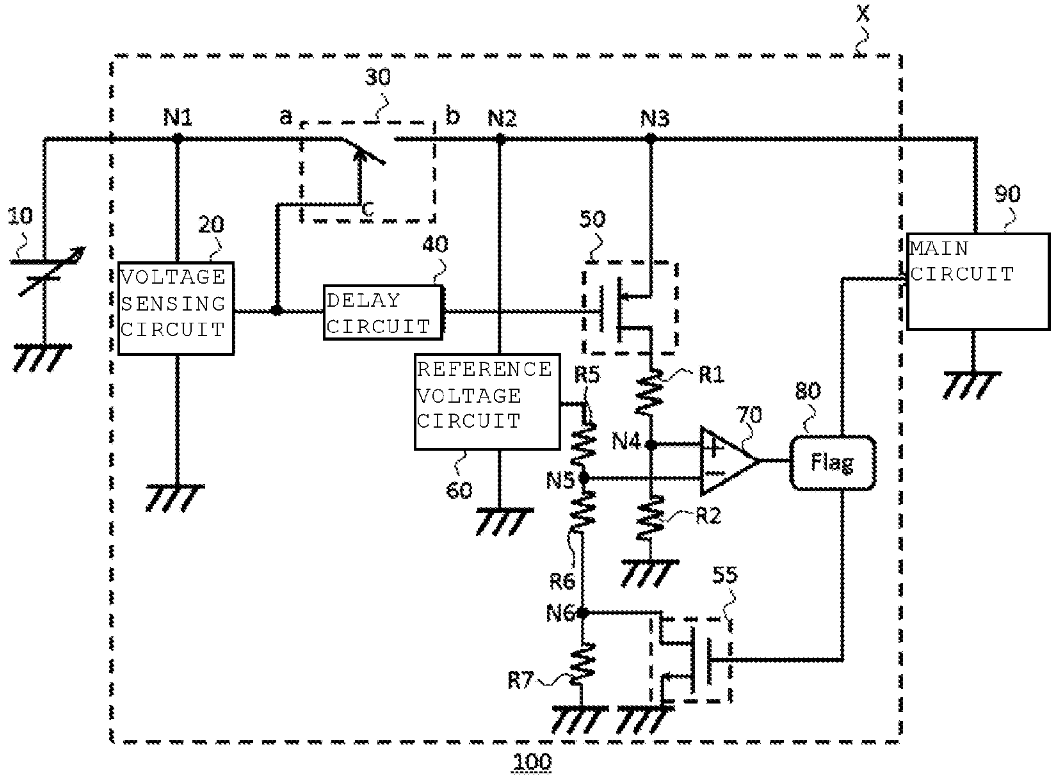
FIG. 6 is a circuit diagram depicting an example of a semiconductor integrated circuit according to a second embodiment.

FIG. 6 is a circuit diagram depicting an example of a power-supply voltage sensing circuit X according to a second embodiment. Incidentally, in the description of the second embodiment, component elements similar to the component elements of the first embodiment are identified with the same characters and the detailed explanations thereof are omitted. In this embodiment, the power-supply voltage sensing circuit X further includes a second transistor 55. Incidentally, the second transistor 55 is an N-type MOS transistor, for example.

In this embodiment, if a voltage at a fifth node N5 is assumed to be Vn5, inputs to the comparison circuit 70 are Vin+=Vn4 and Vin−=Vn5, and, when Vn4≤Vn5 is changed to Vn4 >Vn5, the comparison circuit 70 outputs High and the flag terminal 80 sets a flag (T=tFlag).

Incidentally, at this time, the output (High) of the comparison circuit 70 is input to the gate of the second transistor 55 and the second transistor 55 is switched from OFF to ON. Then, Vn5 becomes a value obtained by division by R5, R6, and R7. Thus, when Vn4>Vn5, Vn5 <Vm and Vin− decreases.

Figure 7:
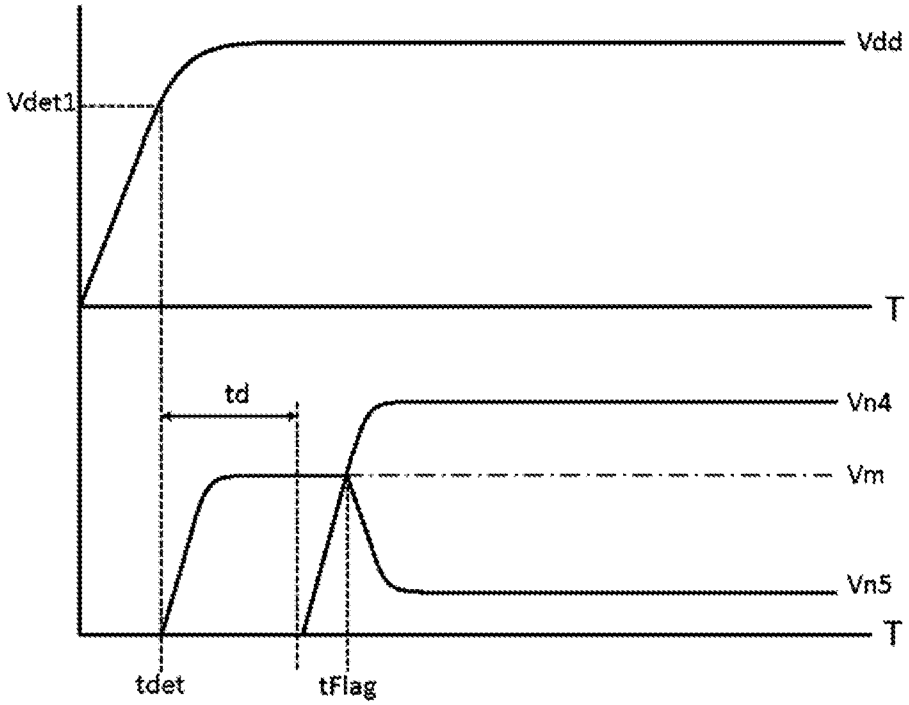
FIG. 7 is a graph schematically depicting temporal changes in Vn5 and Vn4 in the semiconductor integrated circuit of FIG. 6.

FIG. 7 is a graph schematically depicting temporal changes in Vn5 and Vn4 in the example described in this embodiment. Incidentally, as is clear also from FIG. 7, the operation of the power-supply voltage sensing circuit X in this embodiment is the same as the operation in the first embodiment to the point when a state in which one of Vin+ and Vin− of the comparison circuit 70 is greater than the other is changed to a state in which the other is greater than the one of Vin+ and Vin− (that is, T=tFlag). For convenience of explanation, the graph of Vm described in the first embodiment is depicted by an alternate long and short dashed line.

When T<tFlag, the relationship between the voltage Vn5 at the fifth node and the output Vm of the reference voltage circuit 60 is Vn5=Vm. On the other hand, at T=tFlag, the flag terminal 80 sets a flag and the second transistor 55 is turned on. Then, since the voltage values at the sixth node N6 and the fifth node N5 become the values obtained by dividing Vm by the resistors R5 to R7, the value of Vin− which is input to the comparison circuit 70 again becomes smaller than Vm.

In general, the component elements forming the power-supply voltage sensing circuit X are sometimes affected by noise from the outside. For example, if the value of Vn4 is affected by extrinsic noise, the value of Vn4 does not always change (increase) linearly as depicted in FIG. 7; in actuality, the value of Vn4 often increases relatively while being minutely fluctuated.

In the case described above, also in a case in which, for example, Vn4 becomes temporarily greater than Vn5, Vn4 becomes smaller than Vn5 again as a result of the fluctuation of Vn4; that is, the output of the comparison circuit 70 alternates between High and Low and is not stabilized. Incidentally, this phenomenon is called chatter.

On the other hand, in this embodiment, after T=tFlag, the voltage value of Vn5 decreases. At this time, due to an increase in Vn4, even when the values of Vn4 and Vn5 fluctuate by being affected by the extrinsic noise, the output of the comparison circuit 70 is not easily affected thereby. Thus, in this embodiment, chatter can be prevented and an erroneous operation of the main circuit 90 can be suppressed.

Moreover, also in this embodiment, as in the first embodiment, the power-supply voltage sensing circuit X (that is, the IC 100) includes the delay circuit 40 and the first transistor 50. When the first transistor 50 is in an ON state, the first transistor 50 acts as a resistor having the resistance Rtr. The value of Vn4 sometimes fluctuates as a result of the on resistance Rtr being affected by a disturbance.

Therefore, by adopting the configuration in which, as in this embodiment, Vn5 is decreased after a state in which one of the inputs of the comparison circuit 70 is greater than the other is changed to a state in which the other is greater than the one of the inputs, the delay circuit 40 and the first transistor 50 can be used more effectively and stably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A power-supply voltage sensing circuit comprising:

a switch circuit having an input connected to a power supply and an output connected to a main circuit;

a first circuit that outputs a first signal controlling ON/OFF of the switch circuit in accordance with a power-supply voltage supplied by the power supply;

a second circuit that delays the first signal and outputs the delayed first signal as a second signal;

a first transistor that outputs a first voltage in accordance with the second signal from the second circuit;

a third circuit that outputs a reference voltage when supplied with the power-supply voltage; and a comparison circuit that outputs a third signal that controls whether or not the main circuit is to be operated in accordance with the first voltage and the reference voltage.

2. The circuit according to claim 1, wherein the first signal turns the switch circuit off when the first signal has a first state and turns the switch circuit on when the first signal has a second state, and the first circuit outputs the first signal having the first state if the power-supply voltage is less than a first threshold value, and outputs the first signal having the second state if the power-supply voltage is greater than the first threshold value.

3. The circuit according to claim 1, wherein the third signal stops the main circuit when the third signal has a first state and does not stop the main circuit if the third signal has a second state.

4. The circuit according to claim 3, wherein the comparator has a first input connected to the first transistor and a second input connected to the third circuit, and the comparison circuit outputs the third signal having the first state if a voltage at the first input is smaller than or equal to a voltage at the second input, and outputs the third signal having the second state if the voltage at the first input is greater than the voltage at the second input.

5. The circuit according to claim 1, wherein the third circuit is connected to the output of the switch circuit and receives a second voltage from the output of the switch circuit.

6. The circuit according to claim 1, wherein the second circuit includes at least one resistor and at least one capacitor, and a delay time through the second circuit is determined based on a resistance value of the resistor and a capacitance value of the capacitor.

7. A power supply voltage sensing circuit comprising:

a switch circuit that connects and disconnects an external power supply to a switched node connected to a main circuit in accordance with a state of a first signal;

a voltage sensing circuit that senses a voltage from the external power supply and is configured to generate the first signal having a first state if the voltage is below a threshold and having a second state if the voltage is above a threshold;

a delay circuit that delays the first signal and outputs the delayed first signal as a second signal; and a comparison circuit configured to generate a third signal that determines whether or not a voltage at the switched node is to be supplied to the main circuit, the comparison circuit generating the third signal based on the voltage at the switched node and a reference voltage.

8. The circuit according the claim 7, wherein the switch circuit disconnects the external power supply and the switched node if the first signal has the first state, and connects the external power supply and the switched node if the first signal has the second state.

9. The circuit according the claim 8, wherein the switch circuit provides a ground voltage to the switched node when the switch circuit disconnects the external power supply and the switched node.

10. The circuit according the claim 7, further comprising a first transistor connected in series between the switched node and the comparison circuit, wherein the second signal is supplied to a gate of the first transistor.

11. The circuit according the claim 10, further comprising a pair of resistors connected in series between the switched node and ground, the pair of resistors forming a voltage divider that reduces the voltage of the switched node supplied to the comparison circuit.

12. The circuit according the claim 11, wherein the first transistor is turned on when the second signal has a low state.

13. The circuit according to claim 12, further comprising:

a reference voltage circuit;

first, second, and third resistors connected in series between an output of the reference voltage circuit and ground, a voltage at a node between the first and second resistors being supplied to the comparison circuit as the reference voltage; and a second transistor having a first end connected to a node between the second and third resistors and a second end connected to ground, wherein the third signal is input to a gate of the second transistor.

14. The circuit according to claim 13, wherein the comparison circuit has a first input that receives the reduced voltage and a second input that receives the reference voltage and outputs the third signal having a first state to cause the voltage at the switched node not to be supplied to the main circuit or a second state to cause the voltage at the switched node to be supplied to the main circuit.

15. The circuit according to claim 14, wherein the comparison circuit outputs the third signal having the first state if the reduced voltage is smaller than the reference voltage, and outputs the third signal having the second state if the reduced voltage is greater than the reference voltage.

16. The circuit according the claim 7, wherein the delay circuit includes a resistor and a capacitor that set the delay time.

17. The circuit according the claim 7, further comprising a reference voltage circuit that operates when the switched node is powered and, in operation, generates the reference voltage.

18. A power-supply voltage sensing circuit comprising:

a switch circuit having an input connected to a power supply and an output connected to a main circuit;

a first voltage sensing circuit configured to output a control signal for turning the switch circuit on and off in accordance with a power-supply voltage supplied by the power supply; and a second voltage sensing circuit that is connected to the output of the switch circuit and configured to output a control signal to operate the main circuit when a voltage at the output of the switch circuit is greater than a reference voltage after a period of time has elapsed since the control signal for turning on the switch circuit was output by the first voltage sensing circuit.

19. The circuit according to claim 18, further comprising a delay circuit that receives the control signal from the first voltage sensing circuit and delays the received signal, wherein the control signal to operate the main circuit is generated responsive to the delayed signal.

20. The circuit according to claim 18, further comprising a transistor between the output of the switch circuit and the second voltage sensing circuit, the transistor having a gate to which the delayed signal is supplied.

* * * * *